(12) United States Patent
Bellinger

(10) Patent No.: US 6,186,925 B1
(45) Date of Patent: Feb. 13, 2001

(54) SYSTEM FOR PROTECTING DRIVE TRAIN COMPONENTS FROM EXCESSIVE ENGINE INERTIAL FORCES

(75) Inventor: Steven M. Bellinger, Columbus, IN (US)

(73) Assignee: Cummins Engine Company, Inc., Columbus, IN (US)

( * ) Notice: Under 35 U.S.C. 154(b), the term of this patent shall be extended for 0 days.

(21) Appl. No.: 09/191,674

(22) Filed: Nov. 13, 1998

(51) Int. Cl.[7] ................................................. B60K 41/02
(52) U.S. Cl. ....................................... 477/175; 192/103 C
(58) Field of Search .................................... 477/166, 174, 477/175, 176, 180; 192/103 C

(56) References Cited

U.S. PATENT DOCUMENTS

| | | |
|---|---|---|
| 4,200,175 | 4/1980 | Dick . |
| 4,289,222 | 9/1981 | Esthimer . |
| 4,343,387 | 8/1982 | Hofbauer . |
| 4,662,492 | 5/1987 | Troeder . |
| 4,667,787 | 5/1987 | Hofmann . |
| 4,674,609 | 6/1987 | Sturges et al. . |
| 4,722,426 | 2/1988 | Bellanger . |
| 4,722,429 | 2/1988 | Kono . |
| 4,799,160 | 1/1989 | Arbeille et al. . |
| 4,834,226 * | 5/1989 | Ohkumo et al. .................. 192/103 C |
| 5,190,130 | 3/1993 | Thomas et al. . |
| 5,277,286 * | 1/1994 | Yamamoto et al. .............. 192/103 C |
| 5,360,381 | 11/1994 | Swist . |
| 5,378,211 | 1/1995 | Slicker et al. . |
| 5,380,257 | 1/1995 | Coffman et al. . |
| 5,439,428 | 8/1995 | Slicker . |
| 5,489,012 | 2/1996 | Buckley et al. . |
| 5,649,880 | 7/1997 | Tsutsui et al. . |
| 5,679,098 | 10/1997 | Shepherd et al. . |
| 5,735,770 * | 4/1998 | Omote et al. ............................. 477/5 |
| 5,738,606 | 4/1998 | Bellinger . |
| 5,751,579 * | 5/1998 | Hrovat et al. ....................... 701/78 X |
| 5,776,028 * | 7/1998 | Matsuda et al. ................... 477/45 X |
| 5,782,710 * | 7/1998 | Kosik et al. ...................... 477/175 X |

OTHER PUBLICATIONS

Society of Automotive Engineers, SAE J1939/21, pp. 1–35 (Jul. 1998).
Society of Automotive Engineers, SAE J1939/31, pp. 1–17 (Dec. 1997).

* cited by examiner

Primary Examiner—Sherry Estremsky
(74) Attorney, Agent, or Firm—Baker & Daniels

(57) ABSTRACT

A system for protecting one or more drivetrain components from excessive inertial torque includes an automated clutch disposed between an internal combustion engine and a transmission coupled thereto, wherein the automated clutch is responsive to computer control. Under conditions wherein driveline acceleration exceeds an acceleration threshold, wherein the acceleration threshold preferably corresponds to the weakest of the drivetrain components, a control computer is operable to actuate the automated clutch to thereby electronically disengage the engine from the transmission, and accordingly protect the various drivetrain components from damage due to excessive engine inertial torque. In an alternate embodiment, a control computer is operable to compute or otherwise estimate engine inertial torque and actuate the automated clutch as just described if/when the engine inertial torque exceeds a torque threshold corresponding to an input torque capacity of one or more of the drivetrain components.

28 Claims, 2 Drawing Sheets

SYSTEM FOR PROTECTING DRIVE TRAIN COMPONENTS FROM EXCESSIVE ENGINE INERTIAL FORCES

FIELD OF THE INVENTION

The present invention relates generally to electronic control systems for managing the operation of an internal combustion engine and other drive train components, and more specifically to systems for controlling such components so as to protect one or more drive train components from excessive engine inertial forces.

BACKGROUND OF THE INVENTION

Systems for controlling output torque of an internal combustion engine are known and one such system is described in U.S. Pat. No. 5,738,606 to Bellinger which is assigned to the assignee of the present invention, and the contents of which are incorporated herein by reference. One aspect of the Bellinger system is directed to control strategies for limiting engine output torque to the lowest value of the maximum input torque capacities of any of a number of drivetrain components. As a result, engine output torque is limited to the maximum input torque capacity of the weakest of the drivetrain components, thereby protecting all drivetrain components from excessive forces resulting from applied engine output torque.

Under certain vehicle operating conditions, the engine may also possesses substantial engine inertial torque which, if not properly accounted for, may also exceed the maximum input torque capacities of one or more of the drivetrain components. Thus, while systems such as that described in the '606 Bellinger reference may protect drivetrain components from excessive applied engine torque, no systems are known to exist that employ control strategies for protecting one or more of the drivetrain components from excessive engine inertial torque.

As an example of one vehicle operating condition wherein excessive engine inertial torque may damage drivetrain components, consider a tractor-trailer combination backing up to a loading dock in a low gear. If the vehicle operator errs and runs the back of the trailer into the dock, the wheels (as well as the various drivetrain components such as one or more transmissions, tailshaft, drive axle, clutch, etc.) stop rotating, yet the engine still possesses inertia. These rotational inertial forces possessed by the engine are accordingly transferred from the engine output drive shaft directly to the now locked drivetrain. These inertial forces may be substantial and could exceed the maximum input torque capacities of any one or more of the drivetrain components, thus resulting in excessive wear and/or drivetrain damage.

What is therefore needed is a system for protecting drivetrain components from excessive engine inertial torque. Such a system should ideally be operable to determine conditions wherein engine inertial torque is applied to the drivetrain, and implement a control strategy whereby the one or more drivetrain components are protected under conditions wherein the engine inertial torque may be excessive.

SUMMARY OF THE INVENTION

The foregoing shortcomings of the prior art are addressed by the present invention. In accordance with one aspect of the present invention, a system for protecting one or more drive train components from excessive engine inertial forces comprises a drive train including an internal combustion engine coupled by a clutch to a number of additional drive train components, wherein the clutch is responsive to a disengagement signal to automatically disengage the engine from the number of additional drive train components, means for determining an acceleration rate of the drive train and producing an acceleration value corresponding thereto, and a control computer comparing the acceleration value with at least one acceleration threshold corresponding to a maximum acceleration capacity of one of the number of additional drive train components, the control computer producing the disengagement signal if the acceleration value exceeds the at least one acceleration threshold.

In accordance with another aspect of the present invention, a method of protecting one or more of a number of additional drive train components from excessive engine inertial forces in a drive train including an internal combustion engine coupled to the number of additional drive train components, comprises the steps of determining an acceleration rate of the drive train, comparing the acceleration rate with at least one acceleration threshold corresponding to a maximum acceleration capacity of one of the number of additional drive train components, and automatically disengaging the engine from the number of additional drive train components if the acceleration rate exceeds the at least one acceleration threshold.

In accordance with a further aspect of the present invention, a system for protecting one or more drive train components from excessive engine inertial forces comprises a drive train including an internal combustion engine coupled by a clutch to a number of additional drive train components, the clutch responsive to a disengagement signal to disengage the engine from the number of additional drive train components, means for determining an acceleration rate of the drive train and producing an acceleration value corresponding thereto, and a control computer determining an engine inertial torque based on at least the acceleration value and comparing the engine inertial torque with at least one torque threshold corresponding to a maximum torque capacity of one of the number of additional drive train components, the control computer producing the disengagement signal if the engine inertial torque exceeds the at least one torque threshold.

In accordance with yet another aspect of the present invention, a method of protecting one or more of a number of additional drive train components from excessive engine inertial forces in a drive train including an internal combustion engine coupled to the number of additional drive train comprises the steps of determining an acceleration rate of the drive train, determining an engine inertial torque based on at least the acceleration rate, comparing the engine inertial torque with at least one torque threshold corresponding to a maximum torque capacity of one of the number of additional drive train components, and automatically disengaging the engine from the number of additional drive train components if the engine inertial torque exceeds the at least one torque threshold.

These and other objects of the present invention will become more apparent from the following description of the preferred embodiment.

DESCRIPTION OF THE PREFERRED EMBODIMENTS

Figure 1:
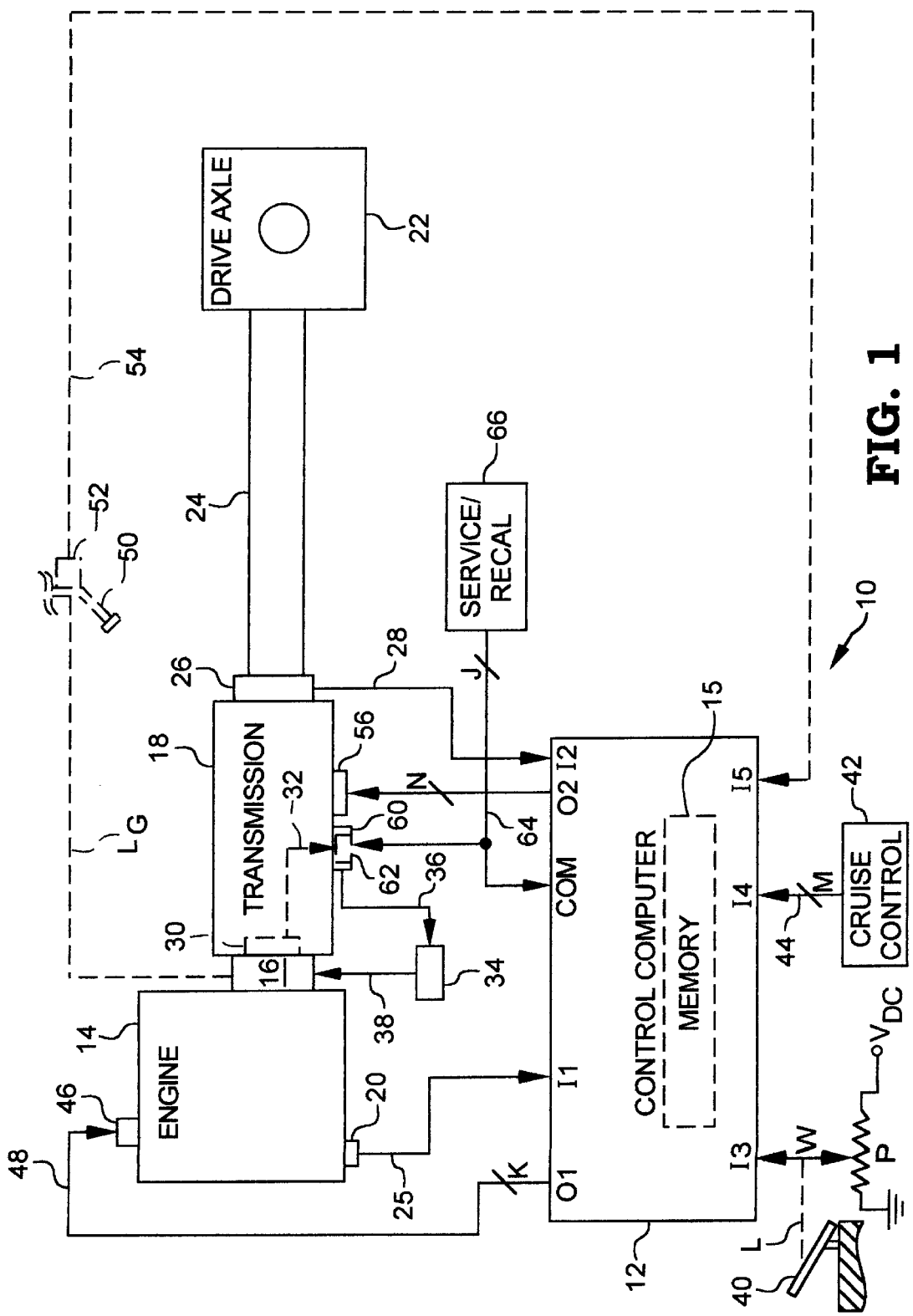
FIG. 1 is a diagrammatic illustration of a system for protecting drive train components from excessive engine inertial forces, in accordance with the present invention.

For the purposes of promoting an understanding of the principles of the invention, reference will now be made to the preferred embodiments illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

Referring to FIG. 1, a system 10 for protecting drive train components from excessive engine inertial forces, in accordance with the present invention, is shown. Central to system 10 is a known control computer 12 operable to control and manage the overall operation of an internal combustion engine 14. Control computer 12 is preferably microprocessor-based and includes a memory portion 15.

Engine 14 forms part of a vehicle drivetrain that further includes a clutch 16 connected thereto, wherein clutch 16 is operatively connected to a transmission 18 as is known in the art. In one embodiment of system 10, transmission 18 is a known fully automatic transmission having a number of automatically selectable gear ratios. In this embodiment, clutch 16 is a known automated clutch responsive to automatic actuation thereof, preferably under the direction of a transmission control computer, to engage/disengage engine 14 from transmission 18 as will be more fully described hereinafter. Alternatively, transmission 18 may be a known automated manual transmission having a number of manually selectable gear ratios and a number of automatically selectable gear ratios. In this embodiment, clutch 16 is responsive to manual actuation thereof to engage/disengage engine 14 from transmission 18 under vehicle launch conditions, as is known in the art. In this case, system 10 further includes a clutch pedal 50 that is mechanically coupled to clutch 16 via linkage $L_G$, wherein clutch pedal 50 may be manually actuated to thereby engage/disengage engine 14 with/from transmission 18 as is known in the art. A clutch pedal position sensor 52 is electrically connected to input IN5 of control computer 12 via signal path 54, wherein sensor 52 is operable to provide a clutch status signal on signal path indicative of the position of clutch pedal 50, e.g. clutch engaged or clutch disengaged. In operation, clutch pedal 50 is used to manually actuate clutch 16 to thereby engage/disengage engine 14 with/from transmission 18 typically only under vehicle launch conditions, and clutch 16 is typically neither manually nor automatically actuated for subsequent automatic shifts. Instead, a transmission control computer is operable to conduct automatic shifts near synchronous speed (i.e. engine speed synchronous with tailshaft speed) so that clutch operation is not necessary. In another alternate embodiment of system 10, transmission 18 is a known semi-automated manual transmission having a number of manually selectable gear ratios and a number of automatically selectable gear ratios. In this embodiment, clutch 16 is manually actuated via clutch pedal 50 to thereby engage/disengage engine 14 with/from transmission 18 during manual gear change operations as is known in the art. During automatic gear change operations, clutch 16 is responsive to computer generated commands to disengage/engage engine 14 with/from transmission 18 as is known in the art. Alternatively, clutch 16 may not be actuated via computer control during automatic shifting sequences, the computer instead conducting automatic shifts near synchronous speed so that clutch operation is not necessary. In this embodiment, system 10 may also include a gear change actuation unit 56 that is electrically connected to an output O2 of control computer 12 via a number N of signal paths 58, wherein N may be any integer. One example of a transmission 18 of this type is a known "Top-2"-type transmission having a number numerically lower gears that are manually selectable and two numerically higher gears (i.e. top two gears) that are automatically selectable. In this example, gear change actuation unit 56 includes two gear change solenoids, wherein control computer 12 is operable to control automatic gear selection in the top two gears via control of the gear change solenoids. In still another alternative embodiment of system 10, transmission 18 may be a known manual transmission having a number of manually selectable gear ratios. In this embodiment, clutch 16 is manually actuated via clutch pedal 50 to engage/disengage engine 14 with/from transmission 18 as is known in the art.

Regardless of the particular embodiment of transmission 18, clutch 16 must be automatically actuatable, preferably under computer control, in accordance with the present invention. Further details of clutch 16 relating to automatic actuation thereof will be described in greater detail hereinafter. Clutch 16 may further be manually actuatable, via clutch pedal 50, depending upon the particular embodiment of transmission 18 as described hereinabove. In any case, transmission 18 is coupled to a drive axle 22 via a propeller shaft, or tailshaft, 24, wherein driving force provided by engine 14 is transferred to the vehicle wheels (not shown) connected to drive axle 22 via transmission 18 and tailshaft 24 as is known in the art. As it relates to the present invention, the vehicle drivetrain thus includes engine 14, clutch 16, transmission 18, tailshaft 24 and drive axle 22. Those skilled in the art will recognize, however, that the vehicle drivetrain may further include one or more auxiliary transmissions and associated drive shafts, power take off (PTO) devices, and/or other known drivetrain components, and that the concepts of the present invention are applicable to any vehicle drivetrain configuration including one or more of the foregoing components.

A number of sensors, actuators and other electronic systems permit control computer 12 to interface with some of the various components of the vehicle drivetrain as well as other vehicle and engine systems. For example, engine 14 includes an engine speed sensor 20 electrically connected to input I1 of control computer 12 via signal path 25. In one embodiment, engine speed sensor 20 is a Hall effect sensor operable to sense speed and/or position of a toothed gear or tone wheel rotating synchronously with the engine crank shaft (not shown). However, the present invention contemplates that sensor 20 may be any known sensor, such as a variable reluctance sensor, operable to sense engine rotational speed and provide an engine speed signal corresponding thereto to control computer 12.

A vehicle speed sensor 26 is preferably disposed about tailshaft 24 adjacent transmission 18 and is electrically connected to input I2 of control computer 12 via signal path 28. In one embodiment, vehicle speed sensor 26 is a variable reluctance sensor operable to sense tailshaft rotational speed and provide a vehicle speed signal corresponding thereto to control computer 12. However, the present invention contemplates that vehicle speed sensor 26 may alternatively be any known sensor suitably located to determine vehicle speed and provide a vehicle speed signal corresponding thereto.

System 10 further includes an accelerator pedal 40 including an accelerator pedal position or percentage sensor electrically connected to input I4 of control computer 12. In one embodiment, the accelerator pedal position or percentage sensor includes a potentiometer P having one end electrically connected to a suitable potential $V_{DC}$ and an opposite end electrically connected to ground potential. A wiper W of the potentiometer is mechanically coupled to the accelerator pedal 40 via linkage L and is electrically connected to input I4 of control computer 12. The voltage on wiper W defines an accelerator pedal position signal that is proportional to the position or percentage of accelerator pedal 40. It is to be understood, however, that the accelerator pedal position or percentage sensor may alternatively be any known sensor operable to sense accelerator position or percentage, or pressure applied to accelerator pedal 40, and provide control computer 12 with an accelerator pedal position or percentage signal corresponding thereto.

System 10 further includes a known cruise control unit 42 connected to an input port I4 of control computer 12 via a number M of signal paths 44, wherein M may be any integer. Cruise control unit 42 typically includes manually actuatable selectors (not shown) for enabling/disabling operation of unit 42 and for selecting known set/coast and accelerate/resume features thereof. Below a specified vehicle speed, cruise control unit 26 further preferably operates in a known power take off (PTO) mode, wherein cruise control unit 42 is operable to maintain a desired engine speed.

Engine 14 further includes a known fueling system 46 electrically connected to an output O1 of control computer 12 via a number K of signal paths 48, wherein K may be any integer. In operation, control computer 12 is responsive to at least the engine speed signal on signal path 25, the vehicle speed signal on signal path 28 and one or more torque request signals to determine fueling commands and produce corresponding fueling signals on signal paths 48. Fuel system 46 is in turn responsive to the fueling signals produced by control computer 12 to supply fuel to the engine 14, as is known in the art. The one or more torque request signals may be provided by accelerator pedal sensor P or cruise control unit 42. Torque requests or torque limiting requests may further be provided by other control systems external to control computer 12 and/or one or more algorithms executable by control computer 12, wherein control computer 12 may be responsive to such torque requests or torque limiting requests in addition to a torque request signal produced by sensor P or unit 42 to produce appropriate fueling commands.

Transmission 18 preferably includes a transmission control module 60 operable to control and manage the overall operation of transmission 18. Module 60 includes a transmission control computer 62 that is preferably microprocessor-based and includes sufficient memory for storing software algorithms, calibration information, and the like. Transmission control computer 62 is connected to a communications port COM of control computer 12 via a number J of signal paths 64, wherein J may be any integer. In one embodiment, signal paths 64 comprise an SAE J1939 datalink whereby control computer 12 and transmission control computer 62 may share information. It is to be understood, however, that signal paths 64 may by any known communication path whereby information collected and managed by control computer 12 is made available to transmission control computer 62, and information collected and managed by transmission control computer 62 is likewise available to control computer 12.

In the embodiment shown in FIG. 1, a service/recalibration tool 66 of known construction is connectable to control computer 12 and/or transmission control computer 62, wherein tool 66 may be used to extract data from either computer or load programming, calibration and/or other data into either computer as is known in the art. Alternatively, service/recalibration tool 66 may be configured to interface only with control computer 12 via a suitable communications link (not shown) such as an SAE J1708 datalink configured for communications pursuant to an SAE J1587 communications protocol.

Also in the embodiment shown in FIG. 1, transmission 18 may include a transmission input speed sensor 30 electrically connected to transmission control computer 62 via signal path 32 (shown in phantom) and operable to provide transmission control computer 62 with a transmission input speed signal corresponding to rotational speed of an input shaft (not shown) of transmission 18. In one embodiment, sensor 30 is a variable reluctance sensor operable to sense rotational speed of a transmission input shaft (not shown) and provide a signal corresponding thereto to computer 62. However, the present invention contemplates that sensor 30 may alternatively be any known sensor suitably located to determine the rotational speed of a transmission input shaft and provide a shaft rotational speed signal corresponding thereto. Transmission control computer 62 may use the transmission input speed signal in place of an engine speed signal provided thereto by control computer 12 via datalink 64 to compute driveline acceleration as will be described more fully hereinafter.

System 10 further includes a clutch actuator 34 electrically connected to transmission control computer 62 via signal path 36 and electrically connected to clutch 16 via signal path 38. Alternatively, signal path 36 may be electrically connected to control computer 12, wherein control computer 12 is operable to automatically control the status of clutch 16. In some embodiments of system 10, for example, transmission 18 may not include transmission control module 60 (particularly if transmission 18 is a manual transmission), in which case signal path 36 is connected to control computer 12 and wherein control computer 12 is operable to automatically control the status of clutch 16. In either case, actuator 34 is responsive to clutch control signals provided thereto to automatically actuate clutch 16 (i.e., automatically engage or disengage engine with/from transmission 18), and in one embodiment actuator 34 includes an electrically actuatable solenoid. However, the present invention contemplates the actuator 34 may be any known electronic, electromechanical, electro-pneumatic or electro-hydraulic device responsive to control signals provided thereto by control computer 12 to automatically actuate clutch 16.

In embodiments of transmission 18 wherein clutch 16 may be automatically actuatable via computer control of actuator 34 and also manually actuatable via clutch pedal 50 as described hereinabove, automated clutch 16 is preferably responsive to signals provided thereto by actuator 34 to disengage engine 14 from transmission 18 regardless of the status of clutch pedal 50. However, if clutch pedal 50 is manually actuated to thereby disengage engine from transmission 18, clutch 16 is preferably non-responsive to a clutch engagement signal provided thereto by actuator 34. In other words, manual disengagement of clutch 16 via clutch pedal 50 preferably overrides any operational state of actuator 34. The following table summarizes the operational status of clutch 16 in response to the status of clutch pedal 50 and the status of actuator 34 for transmission embodiments wherein clutch 16 is configured for manual and automatic actuation thereof.

| Electronic Clutch Input (actuator 34) | Manual Clutch Input (clutch pedal 50) | Operational Status of Clutch 16 |
|---|---|---|
| Disengage | Disengage | Disengaged |
| Disengage | Engage | Disengaged |
| Engage | Disengage | Disengaged |
| Engage | Engage | Engaged |

It should be understood that for embodiments of transmission 18 wherein clutch pedal 50, linkage $L_G$, sensor 52 and signal path 54 are omitted, clutch 16 is responsive solely to signals provided thereto by actuator 34 to engage/disengage engine 14 from transmission 18. In this case, the operational status of clutch 16 follows that of actuator 34.

Figure 2:
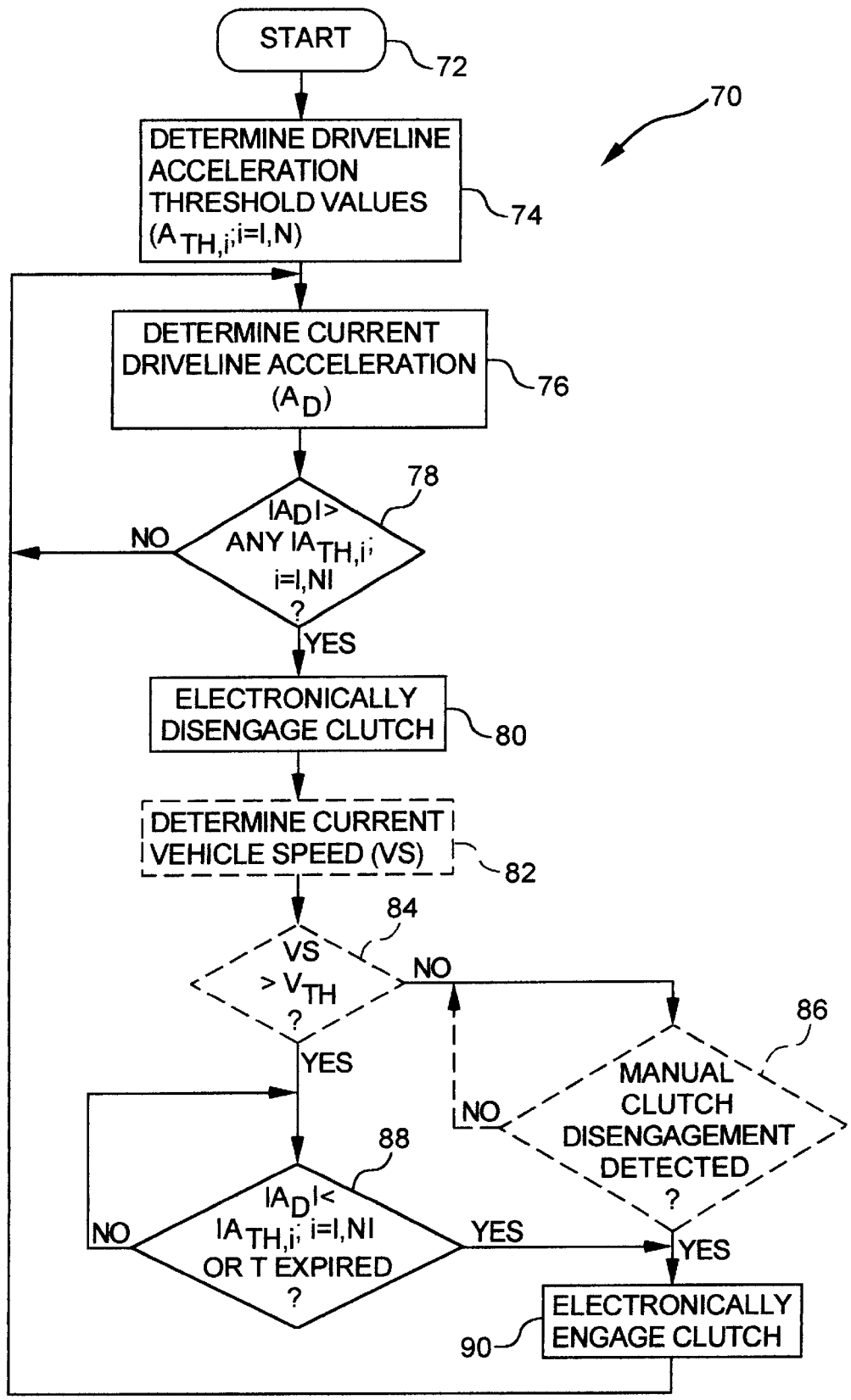
FIG. 2 is a flowchart illustrating one preferred embodiment of a software algorithm for controlling engine/vehicle operation to protect drive train components from excessive engine inertial forces, in accordance with the present invention.

Referring now to FIG. 2, a flowchart is shown illustrating one preferred embodiment of a software algorithm 70 for controlling engine/vehicle operation to protect drivetrain components from excessive engine inertial forces, in accordance with the present invention. Algorithm 70 is preferably stored within a memory unit (not shown) of transmission control module 60, or otherwise provided to transmission control computer 62, and is preferably executed by transmission control computer 62. It is to be understood, however, that algorithm 70 may alternatively be stored within memory 15 and executed by control computer 12. In either case, transmission control computer 62 and control computer 12 are operable to exchange any necessary information and/or commands via signal paths 64 to thereby effectuate the control strategies of algorithm 70. It is to be further understood, however, that in cases where transmission 18 does not include a transmission control module 60, algorithm 70 is executed solely by control computer 12 and control computer 12 is accordingly operable to control clutch 16 via actuator 34 according to algorithm 70. In any event, algorithm 70 will be described hereinafter as being executed by transmission control computer 62, it being understood that any or all steps of algorithm 70 may be alternatively executed by control computer 12.

Algorithm 70 begins at step 72 and at step 74, computer 62 is operable to determine one or more driveline acceleration in threshold values $A_{TH,i}$; i=1, N, wherein N may be any integer. Preferably, the one or more driveline acceleration threshold values are stored within a memory unit (not shown) of transmission control module 60, but may alternatively be stored within memory 15 of control computer 12 and provided to computer 62 via signal paths 64. In either case, the one or more driveline acceleration threshold values are preferably programmable via service/recalibration tool 66. It is to be understood that the acceleration threshold values $A_{TH,i}$; i=1, N may be greater than zero, corresponding to positive acceleration, or less than zero, corresponding to negative acceleration or deceleration. In accordance with the present invention, system 10 is operable to protect drivetrain components from excessive engine inertial torque based on either excessive positive acceleration or excessive deceleration of one or more of the drivetrain components, wherein the term "acceleration" will hereinafter be understood to describe either positive acceleration or deceleration.

In one embodiment of the present invention, the clutch 16, each of the number of selectable gear ratios of transmission 18, the propeller shaft or tailshaft 24 and the drive axle 22, each have a driveline acceleration threshold value associated therewith. Computer 62 is preferably operable at step 74 to determine the driveline acceleration values for the clutch 16, tailshaft 24 and drive axle 22 by recalling these values from memory or otherwise determining these values, and is further preferably operable to determine a currently engaged gear ratio of transmission 18 and recall an acceleration threshold value from memory or otherwise determine an acceleration threshold value corresponding to the currently engaged gear ratio. Computer 62 is operable in one embodiment of step 74 to determine the currently engaged gear ratio as a ratio of engine speed and tailshaft speed, wherein both of these parameters are provided thereto by control computer 12 via signal paths 64. Alternatively, transmission control module 60 may include known means therein for determining currently engaged gear ratio directly from transmission 18. The precise manner in which the currently engaged gear ratio information is computed or obtained, however, does not form part of the present invention, and the present invention accordingly contemplates any known means or technique for determining the currently engaged gear ratio. In any case, computer 62 is thus operable in this embodiment to determine four acceleration threshold values. It is to be understood, however, that the present invention contemplates that any one or more, or only certain ones, of the drivetrain components may have an acceleration threshold value associated therewith and that one or more, or only certain ones, of the selectable gear ratios of transmission 18 and/or any auxiliary transmission included within the drivetrain may have an acceleration threshold value associated therewith. Alternatively, transmission 18 and/or any auxiliary transmission included within the vehicle drivetrain may have only a single acceleration threshold value associated therewith so that step 74 need not include a determination of the presently engaged gear ratio thereof. Alternatively still, only a single acceleration threshold value may be provided wherein the single acceleration threshold value is applicable to the entire vehicle drivetrain.

In any event, algorithm execution continues from step 74 at step 76 where computer 62 is operable to determine a current driveline acceleration value $A_D$. In one embodiment, computer 62 is operable to determine $A_D$ by processing engine speed, provided thereto by control computer 12 via signal paths 64, in accordance with well known equations. Alternatively, computer 62 may be operable at step 76 to determine $A_D$ by processing tailshaft speed, provided thereto by control computer 12 via signal paths 64, in accordance with well known equations. Alternatively still, computer 62 may be operable to determine $A_D$ by processing the speed signal provided thereto by transmission input shaft sensor 30 in accordance with well known equations. It is to be understood, however, that the present invention contemplates processing any sensor or subsystem signal indicative of rotational speed or position of any one or more drivetrain shafts in accordance with well known equations, and determining $A_D$ therefrom.

In any event, algorithm execution continues from step 76 at step 78 where computer 62 is operable to compare the current driveline acceleration value $A_D$ with the one or more driveline acceleration threshold values $A_{TH,i}$; i=1, N. If $A_D$ does not exceed any of the one or more driveline acceleration threshold values, algorithm execution loops back to step 76. If, however, computer 62 determines that $A_D$ exceeds any of the one or more driveline acceleration threshold values $A_{TH,i}$; i=1, N, algorithm execution continues at step 80 where computer 62 is operable to control actuator 34 to electronically disengage clutch 16. Thus, computer 62 is operable, in accordance with the present invention, to effectuate disengagement of engine 14 from transmission 18 in the event that the absolute value of the current driveline acceleration rate exceeds the absolute value of the smallest of the one or more driveline acceleration threshold values, corresponding to the weakest drivetrain component, thereby protecting all of the various drivetrain components from excessive engine inertial forces.

In the event that clutch 16 is manually actuatable via a clutch pedal 50 as described hereinabove, algorithm 70 preferably includes steps 82–86. At step 82, computer 62 is operable to determine a current vehicle speed, preferably provided thereto by control computer 12 via signal paths 64. Thereafter at step 84, if the current vehicle speed is greater than a vehicle speed threshold value $V_{TH}$, algorithm execution continues at step 88 where computer 62 is operable in one embodiment to continue computing $A_D$ and comparing $A_D$ with the one or more driveline acceleration threshold values. As long as $A_D$ remains in excess of all of the one or more driveline acceleration threshold values, step 88 loops back on itself. If/when $A_D$ drops below all of the one or more driveline acceleration threshold values, however, algorithm execution continues at step 90 where computer 62 is operable to control actuator 34 to thereby electronically disengage clutch 16 (i.e., disengage engine 14 from transmission 18). In an alternate embodiment of step 88, computer 62 is operable to monitor an internal timer and loop back to step 88 as long as a time value of the internal timer indicates that some programmable time period T has not expired since electronically disengaging clutch 16 at step 80. If/when the programmable time period T expires since electronically disengaging clutch 16 at step 80, computer 62 is operable to reset the internal timer and advance to step 90 to electronically disengage clutch 16.

If the current vehicle speed is less than or equal to $V_{TH}$ at step 84, algorithm execution continues at step 86 where computer 62 is operable to determine whether clutch 62 is manually disengaged, preferably via the clutch pedal sensor signal monitored by control computer 12 and provided by control computer 12 to computer 62 via signal paths 64. As long as computer 62 fails to detect manual disengagement of clutch 16, step 86 loops back on itself. If/when computer 62 detects manual disengagement of clutch 16, algorithm execution continues at step 90 where computer 62 is operable to control actuator 34 to thereby electronically engaged clutch 16.

Steps 82–86 are preferably included so that if computer 62 electronically disengages clutch 16, manual clutch disengagement of clutch 16 must occur prior to electronically engaging clutch 16 is vehicle speed is below a vehicle speed threshold value. Thus, if vehicle speed is in the range of vehicle launch speeds, steps 82–86 ensure that the vehicle operator is not taken by surprise by an unexpected electronic engagement of clutch 16 after electronic clutch engagement. Instead, computer 62 will not electronically engage clutch 16 unless/until manual clutch disengagement is detected, which is consistent with the table set forth hereinabove in the event that clutch 16 is both electronically and manually actuatable. If system 10 does not include a: clutch pedal 50 or other device operable to manually actuate clutch 16, steps 82–86 may be omitted from algorithm 70, as indicated by the dashed-line representations of steps 82–86.

While the invention has been illustrated and described in detail in the foregoing drawings and description, the same is to be considered as illustrative and not restrictive in character, it being understood that only the preferred embodiments thereof has been shown and described and that all changes and modifications that come within the spirit of the invention are desired to be protected. For example, as an alternative to the acceleration thresholding technique described hereinabove with respect to algorithm 70, the present invention contemplates providing for an drive train torque thresholding technique. In this embodiment, computer 62 is operable to estimate vehicle mass in accordance with one or more known techniques, or recall a programmed vehicle mass value from memory, compute driveline acceleration in accordance with any one or more of the techniques described hereinabove, and compute (or estimate) drive train torque from these two parameters in accordance with Newton's second law (F=ma). Computer 62 is then operable to compare the computed or estimated drive train torque value with one or more programmable drive train torque threshold values stored in memory and electronically disengage clutch 16 if/when the computed or estimated drive train torque exceeds one or more of the drive train torque threshold values stored in memory. Those skilled in the art will recognize modifications to algorithm 70 necessary to effectuate an drive train torque-based control technique rather than a driveline acceleration-based control technique set forth in FIG. 2, that such modifications would be mere mechanical steps to a person of ordinary skill in the computer programming art, and that such an alternative technique falls within the scope of the present invention.

What is claimed is:

1. A system for protecting one or more drive train components from excessive engine inertial forces, comprising:
   a drive train including an internal combustion engine coupled by a clutch to a number of additional drive train components, said clutch responsive to a disengagement signal to automatically disengage said engine from said number of additional drive train components;
   means for determining an acceleration rate of said drive train and producing a acceleration value corresponding thereto; and
   a control computer comparing said acceleration value with at least one acceleration threshold corresponding to a maximum acceleration capacity of one of said number of additional drive train components, said control computer producing said disengagement signal if said acceleration value exceeds said at least one acceleration threshold.

2. The system of claim 1 further including a memory unit having said at least one acceleration threshold stored therein.

3. The system of claim 2 further including a service/recalibration tool configured for communication with said control computer, said at least one acceleration threshold programmable within said memory unit via said tool.

4. The system of claim 2 wherein said memory unit includes a number of acceleration thresholds stored therein, each of said number of acceleration thresholds corresponding to a separate one of said number of additional drive train components;
   and wherein said control computer is operable to compare said acceleration value with each of said number of acceleration thresholds and produce said disengagement signal if said acceleration value exceeds any one of said number of acceleration thresholds.

5. The system of claim 4 wherein said number of additional drive train components includes a transmission having a number of selectable gear ratios;
   and wherein said memory unit further includes acceleration thresholds corresponding to maximum acceleration capacities of at least two of the selectable gear ratios of said transmission.

6. The system of claim 1 further including:
   means for sensing vehicle speed and producing a vehicle speed signal corresponding thereto;

and wherein said clutch includes means responsive to manual clutch engagement for producing a clutch manually engaged signal and to manual clutch disengagement for producing a clutch manually disengaged signal;

and wherein said clutch is further responsive to a clutch engagement signal to automatically engage said engine with said number of additional drive train components as long as said manual clutch engagement signal is present;

and wherein said control computer is operable to produce said clutch engagement signal after producing said clutch disengagement signal upon detection of said clutch manually disengaged signal and if said vehicle speed signal indicates a vehicle speed above a vehicle speed threshold.

7. The system of claim 1 further including:

means for sensing vehicle speed and producing a vehicle speed signal corresponding thereto;

and wherein said control computer is responsive to said vehicle speed signal to monitor said acceleration rate of said drive train and produce a clutch engagement signal after producing said clutch disengagement signal if said acceleration rate of said drive train falls below said at least one acceleration threshold, if said vehicle speed signal indicates a vehicle speed value below a vehicle speed threshold, said clutch responsive to said clutch engagement signal to engage said engine with said number of additional drive train components.

8. The system of claim 1 further including:

means for sensing vehicle speed and producing a vehicle speed signal corresponding thereto;

and wherein said control computer is responsive to said vehicle speed signal produce a clutch engagement signal within a predefined time period after producing said clutch disengagement signal if said vehicle speed signal indicates a vehicle speed below a vehicle speed threshold, said manual/automatic clutch responsive to said clutch engagement signal to engage said engine with said number of additional drive train components.

9. The system of claim 1 wherein said control computer is further operable to control and manage operation of said internal combustion engine.

10. The system of claim 1 further including:

an engine control computer operable to control and manage operation of said internal combustion engine; and a communication link connected between said engine control computer and said control computer;

and wherein said control computer is associated with one of said additional drive train components, said engine control computer receiving said disengagement signal from said control computer via said communication link and providing said disengagement signal to said clutch.

11. The system of claim 10 wherein said communication link is an SAE J1939 data link.

12. In a drive train including an internal combustion engine coupled to a number of additional drive train components, a method of protecting one or more of the number of additional drive train components from excessive engine inertial forces, the method comprising the steps of:

determining an acceleration rate of the drive train;

comparing said acceleration rate with at least one acceleration threshold corresponding to a maximum acceleration capacity of one of said number of additional drive train components; and automatically disengaging the engine from the number of additional drive train components if said acceleration rate exceeds said at least one acceleration threshold.

13. The method of claim 12 wherein the comparing step further includes comparing said acceleration rate with a number of acceleration thresholds each corresponding to maximum acceleration capacities of separate ones of the number of additional drive train components;

and wherein said disengaging step further includes disengaging the engine from the number of additional drive train components if said acceleration rate exceeds any one of said number of acceleration thresholds.

14. The method of claim 12 further including the steps of:

determining vehicle speed;

re-engaging the engine with the number of additional drive train components if said vehicle speed is below a vehicle speed threshold and if said acceleration rate of said drive train falls below said at least one acceleration threshold.

15. The method of claim 12 further including the steps of:

determining vehicle speed;

re-engaging the engine with the number of additional drive train components if said vehicle speed is below a vehicle speed threshold and after expiration of a predefined time period following automatic disengagement of the engine from the number of additional drive train components.

16. A system for protecting one or more drive train components from excessive engine inertial forces, comprising:

a drive train including an internal combustion engine coupled by a clutch to a number of additional drive train components, said clutch responsive to a disengagement signal to disengage said engine from said number of additional drive train components;

means for determining an acceleration rate of said drive train and producing a acceleration value corresponding thereto; and a control computer determining a drive train torque based on at least said acceleration value and comparing said drive train torque with at least one torque threshold corresponding to a maximum torque capacity of one of said number of additional drive train components, said control computer producing said disengagement signal if said drive train torque exceeds said at least one torque threshold.

17. The system of claim 16 further including a memory unit having said at least one torque threshold stored therein.

18. The system of claim 17 wherein said memory unit includes a number of torque thresholds stored therein, each of said number of torque thresholds corresponding to a torque capacity of a separate one of said number of additional drive train components;

and wherein said control computer is operable to compare said drive train torque with each of said number of torque thresholds and produce said disengagement signal if said drive train torque exceeds any one of said number of torque thresholds.

19. The system of claim 17 further including a service/recalibration tool configured for communication with said control computer, said at least one torque threshold programmable within said memory unit via said tool.

20. The system of claim 17 wherein said memory unit includes a vehicle mass value stored therein;

and wherein said control computer is operable to determine said drive train torque based further on said vehicle mass value.

21. The system of claim 16 wherein said control computer is further operable to control and manage operation of said internal combustion engine.

22. The system of claim 16 further including:

an engine control computer operable to control and manage operation of said internal combustion engine; and a communication link connected between said engine control computer and said control computer;

and wherein said control computer is associated with one of said additional drive train components, said engine control computer receiving said disengagement signal from said control computer via said communication link and providing said disengagement signal to said clutch.

23. The system of claim 22 wherein said communication link is an SAE J1939 data link.

24. The system of claim 16 further including means for estimating vehicle mass and producing an estimated vehicle mass value;

and wherein said control computer is operable to determine said drive train torque based further on said estimated vehicle mass value.

25. In a drive train including an internal combustion engine coupled to a number of additional drive train components, a method of protecting one or more of the number of additional drive train components from excessive engine inertial forces, the method comprising the steps of:

determining an acceleration rate of the drive train;

determining a drive train torque based on at least said acceleration rate;

comparing said drive train torque with at least one torque threshold corresponding to a maximum torque capacity of one of said number of additional drive train components; and automatically disengaging the engine from the number of additional drive train components if said drive train torque exceeds said at least one torque threshold.

26. The method of claim 25 wherein the comparing step further includes comparing said drive train torque with a number of torque thresholds each corresponding to maximum torque capacities of separate ones of the number of additional drive train components;

and wherein said disengaging step further includes disengaging the engine from the number of additional drive train components if said drive train torque exceeds any one of said number of torque thresholds.

27. The method of claim 25 wherein the step of determining an drive train torque further includes determining said drive train torque based on a vehicle mass value.

28. The method of claim 27 further including the step of estimating said vehicle mass value.

* * * * *